United States Patent [19]
Nethery

[11] Patent Number: 6,070,798
[45] Date of Patent: Jun. 6, 2000

[54] PURCHASER GENERATED TRANSACTION RECORDING AND NEGOTIABLE INSTRUMENT PAYMENT SYSTEM

[76] Inventor: Kee Nethery, 1442-A Walnut St. #392, Berkeley, Calif. 94709-1405

[21] Appl. No.: 08/804,710

[22] Filed: Feb. 21, 1997

[51] Int. Cl.$^7$ .................................................. G06K 7/10
[52] U.S. Cl. ...................... 235/462.01; 235/375; 705/27; 705/34
[58] Field of Search .................................... 235/462, 432, 235/375, 383, 462.13, 462.15, 470, 381, 462.01; 705/26, 27, 34, 40, 42

[56] References Cited

U.S. PATENT DOCUMENTS

| | | | |
|---|---|---|---|
| 4,528,643 | 7/1985 | Freeny, Jr. | |
| 4,652,733 | 3/1987 | Eng et al. | 235/462 |
| 4,654,482 | 3/1987 | DeAngelis | 379/95 |
| 4,752,675 | 6/1988 | Zetmeir | 235/375 |
| 4,882,475 | 11/1989 | Miller et al. | 235/383 |
| 4,992,940 | 2/1991 | Dworkin | 364/401 |
| 5,162,639 | 11/1992 | Sugiyama | 235/383 |
| 5,216,228 | 6/1993 | Hashimoto | 235/375 |
| 5,258,906 | 11/1993 | Kroll et al. | 705/34 X |
| 5,305,195 | 4/1994 | Murphy | 235/375 X |
| 5,324,922 | 6/1994 | Roberts | 235/375 |
| 5,451,760 | 9/1995 | Renvall | 235/462 |
| 5,451,998 | 9/1995 | Hamrick | 348/13 |
| 5,635,698 | 6/1997 | Terada | 235/462 |
| 5,635,906 | 6/1997 | Joseph | 235/383 X |
| 5,721,832 | 2/1998 | Westrope et al. | 235/383 X |
| 5,727,163 | 3/1998 | Bezos | 235/381 X |
| 5,808,894 | 9/1998 | Wiens et al. | 700/231 |
| 5,832,460 | 11/1998 | Bednar et al. | 705/27 |
| 5,873,077 | 2/1999 | Kanoh et al. | 707/3 |
| 5,963,925 | 10/1999 | Kolling et al. | 705/40 |
| 5,978,780 | 2/1999 | Watson | 705/40 |

*Primary Examiner*—Michael G Lee
*Assistant Examiner*—Jared J. Fureman
*Attorney, Agent, or Firm*—Donald W. Marks

[57] ABSTRACT

A seller's computer system, accessible by a customer's computer over the internet for ordering products, includes a product information unit, a purchase transaction information entry and verification unit; a transaction information storage unit, a transaction code generator, a purchase order generator, a transaction code interpreter and payment processor, and a product purchase control unit. The product information is accessed by the customer's computer to enable the customer to view the product information. Upon receipt of a purchase request from the customer, the seller's computer requests and receives transaction information including information of the product or products to be purchased, customer information, and payment information. When payment is to be made by a payment document or a negotiable instrument such as check, money order, cash or signed credit card authorization, the seller's computer generates and sends to the customer's computer a purchase order including a machine readable transaction code which identifies a stored record in the seller's computer containing the transaction information. Upon receipt of the payment document with a copy of the purchase order, a code reader reads the machine readable transaction code, and the transaction code interpreter and payment processor recalls the corresponding stored record for verification of payment prior to authorizing the sale of the product or products.

5 Claims, 3 Drawing Sheets

12419

Purchase Order

Purchaser: Joan Doe
Address: 1234 Anystreet
City: Anytown
State: AA
Zipcode: 01234
E-Mail: JD@XXX.COM Quantity  Description   Unit Price   Total
   1       Big Boots      $25.00    $25.00
   -       ---              --        --
Total for Order: $25.00

Amount Paid: $25.00
Send this form and payment to:
    Big Boot Company
    67 This Way
    Lake Desert, BB 56789

Payment Method
  ☐ Check
  ☐ Money Order
  ☐ Cash
    Credit card:   ☐ VISA    ☐ MasterCard
     Number: _____ Expiration Date: _____
     Signature: _____

PURCHASER GENERATED TRANSACTION RECORDING AND NEGOTIABLE INSTRUMENT PAYMENT SYSTEM

TECHNICAL FIELD

The present invention relates to systems and methods for conducting sales through an electronic communication link such as the phone system, the internet, or any network for transmitting data, and particularly to such sales involving payment by mailed payment documents or negotiable instruments such as checks, money orders, cash, credit or debit card number authorization documents, etc.

BACKGROUND ART

Sales of products on the internet are often limited to sales by use of credit or debit card numbers or other payment schemes that do not require the transmittal of payment documents or negotiable instruments. The customer enters the product information or code along with a shipping or mailing address together with the customer's credit or debit card number into the seller's computer. The seller's computer can subsequently verify the credit or debit card number and submit the charge to the credit or debit card company or bank prior to or simultaneous with authorization of the sale and the eventual shipment of the ordered product or products. However, fear of stealing, fraud or misuse of credit or debit card numbers has caused many prospective purchasers to avoid submitting such card numbers over the internet or telephone.

Mail order sales can be employed in place of sales over the internet. A mail order sale is conducted by a customer sending in a purchase order form listing the product or products and other purchase information together with a payment document or negotiable instrument such as a check, money order, cash, credit card authorization document or the like. The seller employs personnel for entering the purchase and shipping information from the purchase order form into a computer along with verifying the payment document. However, such data entry into a computer adds to the cost of conducting sales and in some instances may cost as much as or more than the price or profit of a product being purchased. Additionally, mistakes in data entry further add to the cost of conducting sales. Consequently many sellers of products on the internet prohibit sales involving mail orders with payment documents or negotiable instruments such as checks, money orders, cash, credit card authorization documents or the like.

Machine readable codes, such as bar codes, 2D codes or the like, are used in many types of transactions. Various companies, including utility companies, have computers with code readers for reading account numbers printed on a returned portion of a bill to properly identify and credit payment to an account. Bar codes are used to identify a product and to call the product name and price stored in a computer to a cash register, to control and track the path of articles being shipped, to sort and direct mail, and to identify library card holders, hospital patients or entry card holders. Other prior art suggestions for use of machine readable codes include identifying computer stored addressees for evaluating the effectiveness of mail advertising, automatically cataloging and storing pictorial and/or written sections of information in the form of 35-mm slides, X-rays, store catalog pages, etc., for generating audio signals transmittable over telephone lines to control operation of equipment such as a VCR at a called station, to order products, and to pay bills.

SUMMARY OF INVENTION

The invention is summarized in a system for enabling payment by a payment document or a negotiable instrument and the mail order sale of products by product selection and purchase order transmission over an electronic communications link such as a telephone line, the internet or other data link. Purchase. transaction information including information of the product or products to be purchased, customer information, and payment information is requested and received by the seller's computer which stores the transaction information. A purchase order including a machine readable code identifying the stored transaction information is generated by the seller's computer and transmitted to the customer who then prints a copy of the purchase order and sends the purchase order copy together with the payment by a payment document or a negotiable instrument to the seller. Upon receipt of the copy of the purchase order accompanied by the payment document, the machine readable code on the purchase order is read by a code reader and used to automatically recall the stored purchase order information to enable verification of the payment by the payment document.

An object of the invention is to provide a system for enabling remote purchase over a network of products using payment documents for payment with reduced selling costs.

The term "payment document" refers to a physical document which is used for payment, or authorization for payment, of goods or services. Payment documents include negotiable instruments such as checks, money orders, cash, signed credit or debit card authorizations and the like normally sent by mail, courier, etc., but exclude electronic transactions such as credit or debit card authorizations sent through an electronic communications link.

Other objects, advantages and features will be apparent from the following description of the preferred embodiments.

DESCRIPTION OF THE PREFERRED EMBODIMENT

Figure 1:
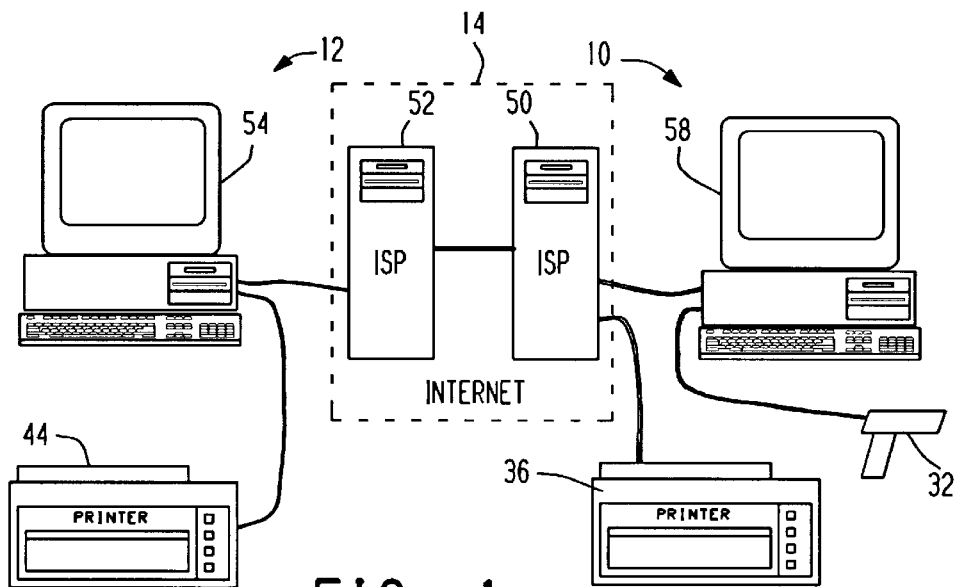
FIG. 1 is a diagram of a system with computers interconnected by internet for product sale and purchase in accordance with the invention.

As shown in FIG. 1, a system for handling purchase orders and payment by a payment document or a negotiable instrument using an electronic communications link in accordance with one embodiment in the present invention includes a seller's computer system 10 which can be selectively called by one or more customers' computer systems 12 over the electronic communications link such as the internet 14.

Figure 2:
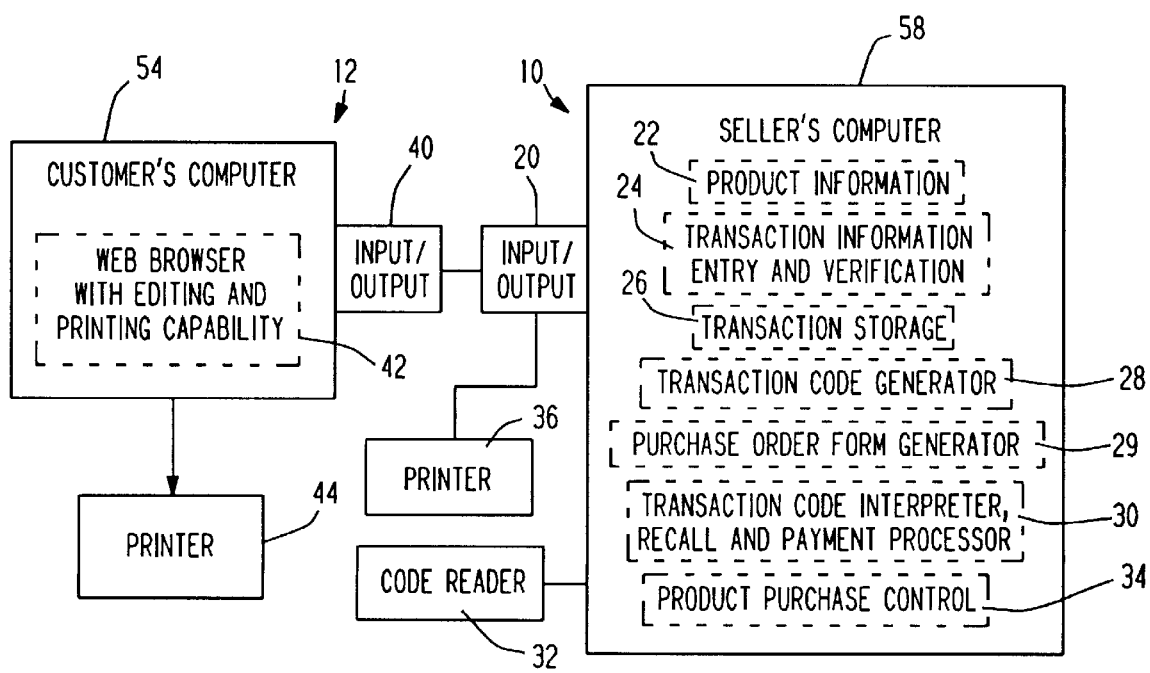
FIG. 2 is a block diagram illustrating in more detail the system of FIG. 1.

As illustrated in FIG. 2, the seller's computer system 10, which can be formed by one or more computers 58, includes an input/output unit 20 for transmitting and receiving digital information to and from a customer's computer 54 in the customer's computer system; a product information unit 22, which when called, outputs product information for transmission by the input/output unit 20; a transaction information entry and verification unit 24 for communicating through the input/output unit 20 with the customers computer to request, receive and verify transaction information; a transaction storage unit 26; a transaction code generator 28 for creating a transaction code identifying each stored transaction; a purchase order form generator 29 for generating a purchase order form including a machine readable transaction code corresponding to the transaction code from the transaction code generator 28 to transmit through the input/output unit 20 to the customer's computer; a transaction code interpreter and payment processor 30 for recalling the corresponding stored transaction when the machine code on a returned purchase order form is read by a code reader 32 connected to the seller's computer system 10; and a product purchase control unit 34 for indicating that payment for the purchase has been received and the product or products have been purchased and, if the prospective customer has indicated a return network address, sending return notification via the input/output 20 such as a notification of failure of payment in the event payment by the purchase document cannot be verified. In the seller's computer system 10, the product information unit 22, the transaction information entry and verification unit 24, the transaction storage unit 26, the transaction code generator 28, the purchase order form generator 29, the transaction code interpreter, recall and payment processor 30 and the product purchase control 34 are formed by programming in one or more interconnected computers. A printer 36 at the seller's location is connected to the input/output unit 20 for receiving and printing information from the customer's and the seller's computers; for example, a notification of failure of payment can be printed for mailing to the customer in the event payment by negotiable instrument cannot be verified and less costly notification methods are unavailable. The printer 36 can be connected to the computer system 10 rather than to the internet 14. Additionally the seller's computer system 10 can be a part of the internet or an ISP connected by integrated services digital network (ISDN), T1 (DS1), T3 and/or other communication systems, with other computers or ISPs forming the internet.

The customer's computer 12 includes an input/output unit 40 for receiving and transmitting digital information from and to the seller's computer system 10; a processor such as a browser 42 with data entry, editing and printing capability for enabling the customer to obtain product information, to request a purchase, to receive a request for transaction information, to enter and send the transaction information through the input/output unit 40 to the seller's computer; and a printer 44 to print out the purchase order form for mailing with a payment document or a negotiable instrument. In the customer's computer 54, the form processor 42 can be a conventional world wide web browser or any other communication program which enables the customer to enter information and transmit the information through the internet 14 to the seller's computer system as well as to receive information sent back from the seller's computer. Alternatively to the purchase order form generator 29 residing in the seller's computer system, the purchase order form generator 29 can reside on, or be downloaded into, the customer's computer to create the machine readable transaction code and the purchase order from a transmitted transaction code and purchase order form information.

The system of FIG. 1, where the customer's computer system 12 and the seller's computer system 10 are connected by the internet 14, may include internet service providers (ISPs) 50 and 52 providing high speed connections from the respective seller computer 58 and customer computer 54 through the internet 14. The customer's computer 54 typically includes a modem which is connected by the public telephone system to the ISP 52 or includes a network interface that is directly connected to a network that is connected to an ISP 52. The input/output units 20 and 40 of FIG. 2 represent the software communication procedures, the hardware, and the data transmission connections necessary to receive and pass digital information from and to corresponding input/output units 40 and 20 through the network.

Figure 3:
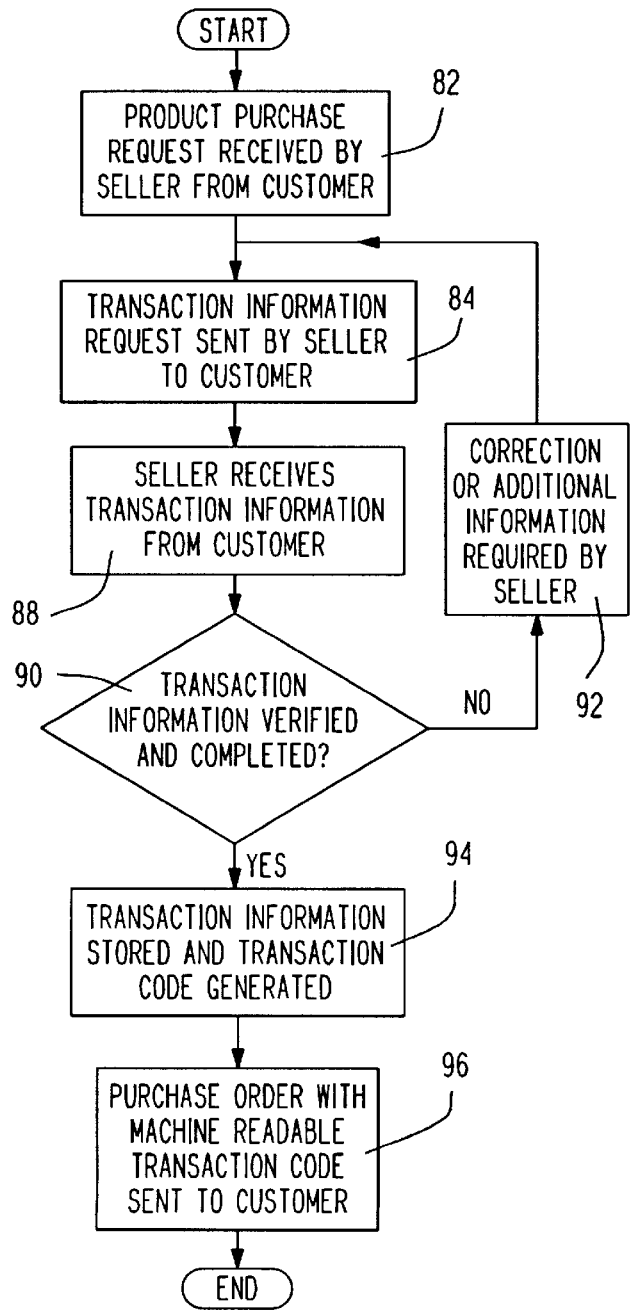
FIG. 3 is a flow chart of a computer procedure employed in a seller's computer in the system of FIGS. 1 and 2 for processing product purchase requests.

The operation of the seller's computer system is illustrated in FIG. 3. Initially the customer, by use of the browser 42 or other communication system, contacts the seller's computer through a connection and obtains the product information from the product information unit 22. If the customer desires to purchase one or more products viewed by the web browser 42, the customer enters a product purchase request which is sent over the network by the customers computer system and received in step 82 by the seller's computer system. Then in step 84, the seller's computer system 10 sends a transaction information request to the customer's computer system. The transaction information request can be in the form of a series of questions each of which are answered in turn before the next question, or can be a single information form in which the customer enters all the requested information before transmitting the form with answers back to the seller's computer system 10. When the seller's computer system in step 88 receives the transaction information, the seller's computer system in step 90 checks and verifies the transaction information for accuracy and completeness. If the transaction information is incomplete or is incorrect, the seller's computer system in step 92 requests completion and/or correction and returns to step 84. When the transaction information supplied by the customer to the seller's computer system has been completed and verified, the seller's computer system in step 94 stores the transaction information and generates a corresponding transaction code identifying the stored transaction information. Then the seller's computer system, in step 96, transmits a completed purchase order including the transaction information and the transaction code wherein the transaction code is transmitted in machine readable form, such as a graphical bar code, to the customer's computer.

Figure 5:
FIG. 5 is a front view of a copy of a purchase order printed out by the customer's computer to accompany (in this example) payment by check, or by credit card authorization printed on the purchase order.

The sample purchase order 98, shown in FIG. 5, includes the transaction code as a bar code 100 which identifies the stored transaction information in the seller's computer system. Other machine readable codes such number codes which can be read by optical character readers can be used in place of or in addition to the bar code. Additionally the purchase order can include product purchase information 102 such as quantity, description, unit price, total price for each listed product, and total price for all products purchased; customer information 104 such as name, address, city, state, zipcode, electronic mail address ("E-mail"); payment information 106 such as, total amount being paid and instructions on making payment; indication 108 of payment by check, money order, cash, etc., when appropriate; and a credit card authorization form 110 for completion and signature by the customer when appropriate. A completed copy of the purchase order is physically transferred, by mail, courier, etc., along with payment by payment document such as a check, a money order, cash or the signed and completed credit card authorization portion 110 of the purchase order from the customer to the seller.

Figure 4:
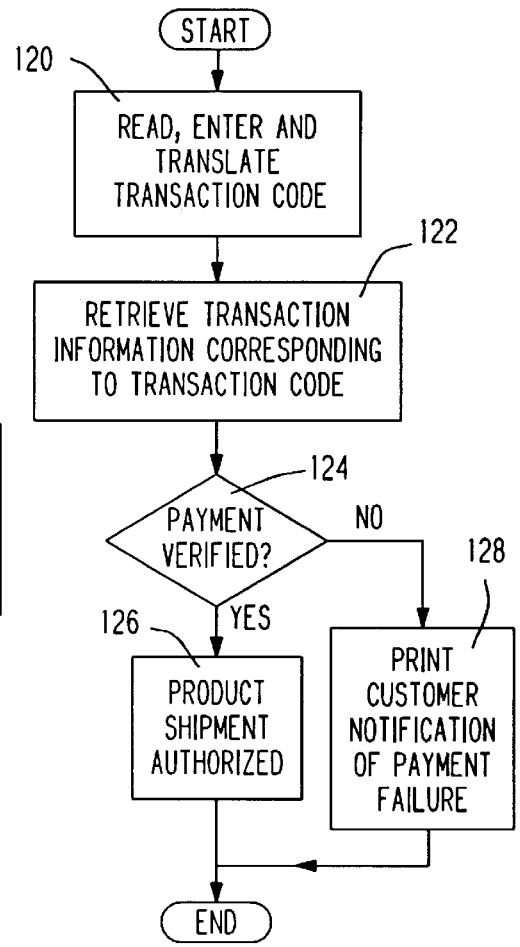
FIG. 4 is a flow chart of a computer procedure employed in a seller's computer in the system of FIGS. 1 and 2 for processing payment by payment document.

When the payment is made by a purchase document such as a check, money order, cash, credit card authorization or the like, the transaction code interpreter, recall and payment processor 30 in the seller's computer performs the procedure illustrated in FIG. 4. In step 120, the machine readable transaction code on the returned copy of the purchase order is read by the code reader 32 and translated into a form usable by the computer. The transaction code is used in step 122 to retrieve the stored transaction information in the seller's computer. Then in step 124, the seller's computer requires the entry of an indication whether or not the payment is verified. Payment verification can be done by the seller's computer by using a check reader (not shown) for reading the bank number and the account number from the check enclosed with the purchase order; transmitting the bank number, account number, and total purchase amount to a computerized check approval bureau; and receiving check approval or disapproval in return. Where payment is by a signed credit card authorization, the credit card number can be entered and transmitted to the credit card company, bank or other organization for approval and payment. Otherwise the seller can inspect the check or other negotiable instrument to determine that the check, credit card authorization, or other document appears to be proper and enters approval or disapproval into the seller's computer. If the payment is verified in step 124, the seller's computer authorizes sale of the purchased product or products and relays that information to the customer in step 126. If the payment is not verified in step 124, the seller's computer in step 128 prints a letter addressed to the customer or transmits a letter over the internet to the customers E-mail address to notify the customer of the reason that the payment was not verified.

The above described embodiment is only illustrative of a single embodiment of the invention, and many other embodiments which contain variations, changes in detail and modifications can be devised without departing from the scope and spirit of the invention as defined in the following claims.

What is claimed is:

1. A system for processing product purchase orders with payment by payment document comprising:

means for containing seller's product sale information which can be obtained electronically through a communications link by a customer;

means responsive to a request to purchase a product for requesting and receiving transaction information electronically through the communications link from the customer;

said transaction information including information of a product to be purchased, customer information, and payment information;

means for storing the received transaction information;

means responsive to the received transaction information for generating a purchase order with a printable machine readable transaction code identifying the stored transaction information;

means for transmitting the purchase order with the printable machine readable transaction code electronically through the communication link to the customer;

a code reader for reading the printable machine readable transaction code on a returned printed copy of the purchase order;

said returned printed copy being printed by a customer's printer; and means responsive to the read machine readable transaction code for recalling the stored transaction information to enable verification of payment by a payment document accompanying the returned printed copy.

2. A system for processing product purchase orders with payment by a payment document as claimed in claim 1 wherein the machine readable transaction code is a bar code or a 2D code.

3. A system for processing product purchase orders with payment by a payment document as claimed in claim 2 including means responsive to verification of the payment by the payment document for authorizing shipment of the product to be purchased.

4. A system for processing product purchase orders with payment by a payment document as claimed in claim 1 including means responsive to verification of the payment by the payment document for authorizing sale of the product.

5. A system for processing product purchase orders with payment by a payment document as claimed in claim 1 wherein the product information includes quantity, description, unit price, total price for each listed product, and total price for all products purchased; the customer information includes name, address, city, state, and zipcode.

* * * * *